United States Patent [19]

Katagiri et al.

[11] Patent Number: 4,862,305

[45] Date of Patent: Aug. 29, 1989

[54] OPTICAL SYSTEM FOR MAGNETIC TAPE END DETECTION

[75] Inventors: Shingo Katagiri; Seizi Odate; Shozo Onmori, all of Kanagawa, Japan

[73] Assignee: Fuji Photo Film Co., Ltd., Kanagawa, Japan

[21] Appl. No.: 67,030

[22] Filed: Jun. 29, 1987

[30] Foreign Application Priority Data

Jun. 27, 1986 [JP] Japan .............................. 61-97638[U]

[51] Int. Cl.$^4$ ............................................. G11B 23/02
[52] U.S. Cl. ..................................... 360/132; 360/74.6
[58] Field of Search ..................... 360/74.1, 74.5–74.6, 360/132; 242/188, 197–200

[56] References Cited

U.S. PATENT DOCUMENTS 3,614,453 10/1971 Johnson .............................. 360/74.6
4,631,618 12/1986 Ozawa et al. ........................ 360/132

FOREIGN PATENT DOCUMENTS 3327092 2/1984 Fed. Rep. of Germany ..... 360/74.6
0068256 4/1983 Japan .
0145747 7/1986 Japan .................................. 360/74.6

Primary Examiner—Stuart N. Hecker
Assistant Examiner—David J. Severin
Attorney, Agent, or Firm—Sughrue, Mion, Zinn, Macpeak & Seas

[57] ABSTRACT

A magnetic tape cassette having a locking member locking the tape reels and a prism for transmitting light reflected therein across a tape transport path to detect the end of the tape. The prism receives and transmits the light through two holes in the cassette case. A projection on the locking member moves between the holes when the reels are unlocked to block light spuriously reflected from the incident surface of the prism from being detected as light transmitted through the prism.

5 Claims, 3 Drawing Sheets

OPTICAL SYSTEM FOR MAGNETIC TAPE END DETECTION

BACKGROUND OF THE INVENTION

1. Field of the Invention

The present invention generally relates to a magnetic tape cassette. It particularly relates to an compact magnetic tape cassette whose size is not larger than a magnetic tape cassette of the Philips type and which is used in audio equipment or the like.

2. Background of the Invention

In recent years, the size and weight of cassette tape recorders has been reduced. A compact magnetic tape cassette has become widely used for cassette tape recorders of reduced size and weight. In the field of audio equipment, magnetic tape cassettes usable for recording and reproduction of high quality and density have been long desired. A type of magnetic tape cassette which meets this desire is is the magnetic tape cassette of the digital type which records pulse code modulated (PCM) signals. In this system, the input signal is converted into pulses for recording and reproduction in an operation different from the analog type.

Nowadays, large video tape cassettes have become generally used for digital recording. In this large video tape cassette, the recordable frequency band is made about five times wider than that for a conventional audio tape cassette. The large video tape cassette is recorded and played with a rotary-head system (except for special cases) and has such a construction that an opening provided in the front of the cassette covered by a guard panel openable upward from the cassette. Since the large video tape cassette is of the digital type, recording and reproduction of high density and wide frequency band are performed with a shorter recording wavelength than in a conventional compact audio tape cassette. For that reason, the video tape cassette needs a design that includes dust-proofing and tape protection measures.

The magnetic tape cassette, to which the present invention relates and which meets the above-mentioned desire, can be used for audio equipment or the like for which a recording/reproduction system of relatively wide frequency band is adopted and can be used as well as a video tape cassette. The size of the magnetic tape cassette is no larger than that of the conventional compact audio tape cassette and is therefore very small.

A mechanism has been proposed which detects the end of a magnetic tape to stop the operation of a recording/reproduction machine at the end of movement of the tape when recording or reproduction is performed using a magnetic tape cassette. In one such mechanism, a light emission element and a light reception element are disposed on either side apart of the tape movement path to determine whether or not light from the light emission element reaches the light reception element. If the light is transmitted through a transparent tape provided at the end of the magnetic tape, the end of the magnetic tape is detected. Since the light emission element and the light reception element are provided in the recording/reproduction machine, there remains extra internal space in the magnetic tape cassette if the size of the cassette is as large as that of a conventional video tape cassette. In that case, one of the light emission and light reception elements can be put in the magnetic tape cassette and located behind the magnetic tape. However, since the size of the magnetic tape cassette to which the present invention relates is so small that it is very difficult to put the light emission element or the light reception element in the cassette, both the light emission element and the light reception element need to be placed outside the cassette.

A magnetic tape cassette has been proposed, as shown in FIG. 1, which is constructed so that an L-shaped prism 1 is provided in the cassette and light from a light emission element 8 is reflected behind a magnetic tape 10 and then reflected again to reach a light reception element 9 in a path passing through a tape movement path. The prism 1 is made of a transparent material and comprises a horizontal portion 3 having a light reception surface 2 and a vertical portion 4. The top and bottom of the vertical portion 4 are provided with a first reflection surface 5 and a second reflection surface 6. The prisms 1 are secured inside both the side walls of the cassette, for example, so that the light reception surface 2 and the second reflection surface 6 face outward with regard to the cassette. The side walls corresponding to the light reception surface 2 and the second reflection surface 6 are provided with notches or through holes. The magnetic tape 7 is moved in the space between the vertical portion 4 and the side wall of the cassette. The recording/reproduction machine includes the light emission element 8 opposed to the light reception surface 2 of the prism 1 and the light reception element 9 opposed to the second reflection surface 6 of the prism across the magnetic type 7. The light from the light emission 8 enters into the prism 1. When the magnetic tape 7 is being moved over the horizontal portion 3 of the prism 1, the light from the second reflection surface 6 does not reach the light reception element 9 but is blocked by the opaque magnetic tape 7. When a transparent tape 10 continuous with the end of the magnetic tape 7 is being moved, the light from the second reflection surface 6 reaches the light reception element 9 through the transparent tape 10. The end of the magnetic tape 7 can be detected by finding out whether or not the light entering the prism 1 from the light emission element 8 reaches the light reception element 9. However, the larger the angle of incidence of the light to the light reception surface, the more the light is reflected by the surface 2. The amount of light entering the prism 1 thus decreases, and the light reflected by the surface 2 reaches the light reception element 9 directly, to cause the magnetic tape end detection mechanism to operate improperly.

Since the size of the magnetic tape cassette to which the present invention relates is small and the distance between the light emission element and light reception element of a recording/reproduction machine for the cassette is short, the light reflected by the light reception surface is more likely to reach the light reception element. Therefore, this is a very serious problem.

SUMMARY OF THE INVENTION

The present invention was made in consideration of the above-described problem.

Accordingly, it is an object of the present invention to provide a magnetic tape cassette of such high reliability that the end of a magnetic tape can be precisely detected.

The invention can be summarized as a magnetic tape cassette having a pair of hubs on which a magnetic tape is wound, a locking member for locking the bosses, and a prism which receives light from an externally-located light emission element and reflects the light to transmit it to a light reception element. All these elements are provided in internal space defined by an upper and lower half casings. The magnetic tape cassette of the invention is characterized in that a projection for blocking the reflected light is provided between a light inlet hole and a light outlet hole which are provided in the upper and the lower half casings respectively.

DETAILED DESCRIPTION OF PREFERRED EMBODIMENTS

Figure 2:
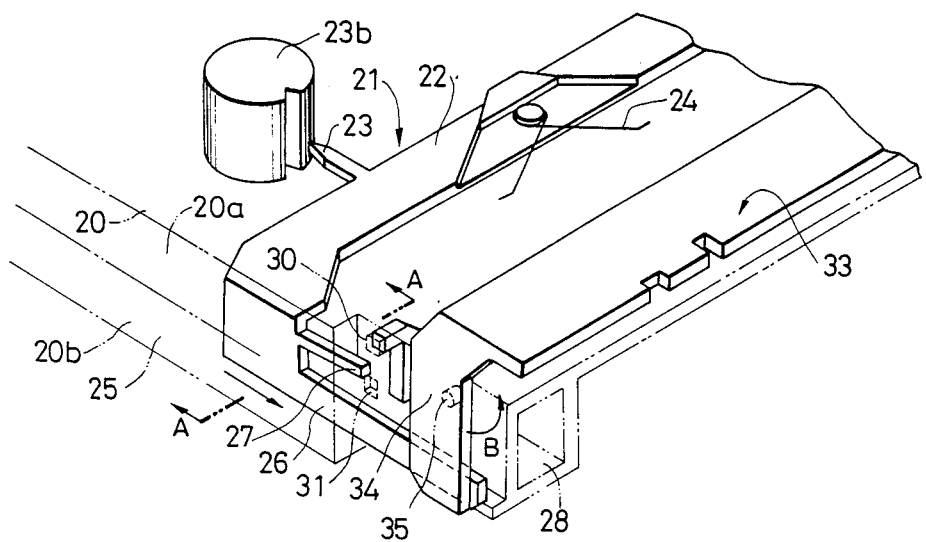
FIG. 2 shows a perspective schematic view of a major part of an embodiment of the present invention.
Figure 3:
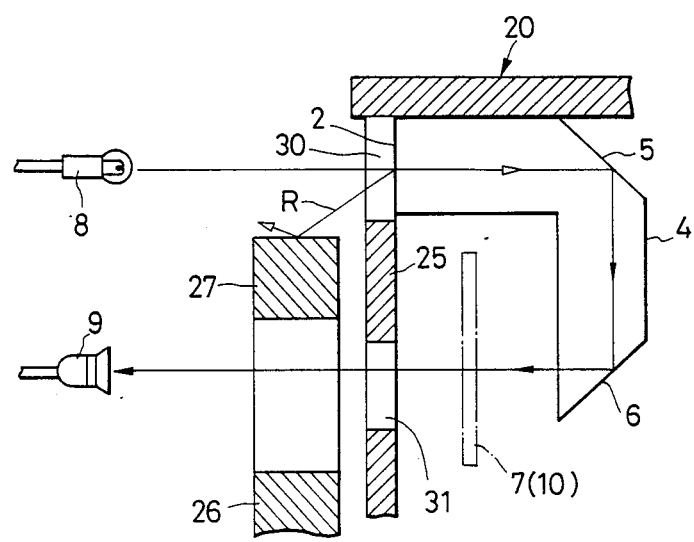
FIG. 3 shows an enlarged sectional view along a line A—A shown in FIG. 2.
Figure 4:
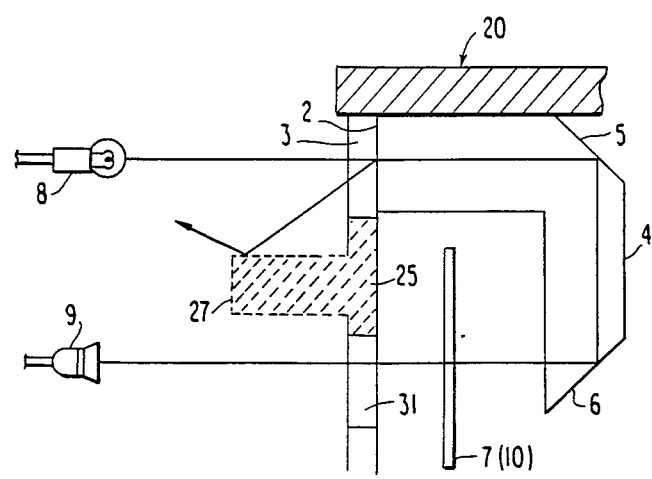
FIG. 4 shows a projection integrally provided on the sidewall of the cassette tape.

A preferred embodiment of the present invention is hereafter described with reference to the drawings attached hereto. FIG. 2 shows a perspective schematic view of a major part of a magnetic tape cassette which is the embodiment. FIG. 3 shows an enlarged sectional view along a line A—A shown in FIG. 2.

In the magnetic tape cassette, a locking member 21 locks a pair of hubs 23b on which a magnetic tape 7 is wound. The locking member 21 is enclosed within a body 20 of the cassette, which consists of an upper and a lower half casing (shown by one-dot chain lines in FIG. 2). As a result, the locking member 21 slides in the forward and backward directions of the cassette. The flat portion 22 of the locking member 21, which is located near the top of the cassette body 20, is provided with a pair of sharp-pointed projections 23 (only one of which is shown in FIG. 2) which are located near the right and left ends of the flat portion 22 and act to lock the hubs 23b. The central part of the flat portion 22 is provided with a boss for attaching a spring 24 for urging the locking member 21 in the backward direction of the magnetic tape cassette. The right and left ends of the flat portion 22 are provided with arms 26 (only one of which is shown in FIG. 2) extending in the forward direction of the magnetic tape cassette along the side wall 25 thereof. Projections 27 (only one of which is shown in FIG. 2) near the butts of the arms 26 extend in the same directions as the arms 26.

Prisms 1 (only one of which is shown in FIG. 2) are provided inside the tape pull-out opening 28 of the cassette body 20. The prism 1 is made of a transparent plastic and shaped as an L and comprises, as shown in FIG. 3, a horizontal portion 3 and a vertical portion 4. A light reception surface 2, which is the front of the horizontal portion 3, faces a light inlet hole 30 provided in the side wall 25 of the magnetic tape cassette. The top and bottom of the vertical portion 4 respectively have first and second reflection surfaces 5 and 6. The second reflection surface 6 faces a light outlet hole 31. The light inlet and outlet holes 30, 31 are formed respectively in an upper and a lower half casing 20a and 20b of the cassette body.

Figure 1:
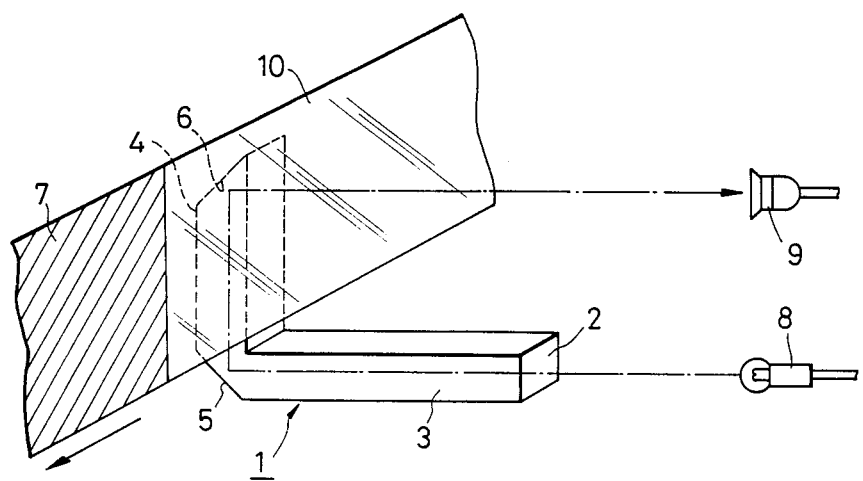
FIG. 1 shows a perspective schematic view for describing the operation of a prism.

When the magnetic tape cassette shown in FIG. 1 is loaded in a recording/reproduction machine, a guard panel 33 covering the front of the cassette body 20 is turned in a direction B about shafts 35 provided on the inside surface of the side walls 34 of the guard panel 33. During rotation, a portion of each side wall 34 is engaged with a catch at the tip of the corresponding arm 26 of the locking member 21 so that the locking member slides in the forward direction of the magnetic tape cassette. As a result, the hubs 23b are unlocked from the sharp-pointed projections 23, and the projection 27 provided near the butt of the arm 26 is moved in between the light inlet hole 30 and the light outlet hole 31 as shown in FIG. 3.

The function of the prism 1 is the same as that of a conventional prism. When the magnetic tape cassette is loaded in the recording/reproduction machine, light such as infrared rays from a light emission element 8 enters into the prism 1 through the light reception surface 2 and proceeds through the horizontal portion 3 so that the light is reflected by the first reflection surface 5 and proceeds through the vertical portion 4. The light is then reflected by the second reflection surface 6 and horizontally proceeds to a light reception element 9. When an opaque magnetic tape 7 extends across the path of the light, the light does not reach the light reception element 9. When a transparent tape 10 at the end of the magnetic tape 7 extends across the path of the light, the light reaches the light reception element 9 so that the end of the magnetic tape is detected. The driver of the recording/reproduction machine is appropriately controlled by a signal generated as a result of the detection.

Since the light emitted from the light emission element 8 toward the light reception surface 2 is not all perpendicular to the surface, some of the light is reflected by the light reception surface 2 as shown in FIG. 3. Especially when the light emission element 8 and the light reception surface 2 are not properly positioned relative to each other for some reason, the quantity of the reflected light is likely to increase. However, in the above described configuration, the projection 27 prevents the reflected light from reaching the light reception element 9. Therefore, the end of the magnetic tape 7 is precisely detected to eliminate erroneous tape stoppage or continued, the movement of the tape despite the pulling-out of the end of the tape and the like.

Although the projections 27 are provided on the locking member 21 in the above-described embodiment, the present invention is not confined thereto but the projections 27 may be provided on the side walls 25 of the magnetic tape cassette if the projections are not so large as to collide with the side walls 34 of the guard panel 33. Since the projections 27 are provided on the locking member 21 in the above-described embodiment, the projections are located in the cassette body 20 when the guard panel 33 is closed when the magnetic tape cassette is not in use. For that reason, the projections 27 can be made as large as described so as to not at all hinder the operation of the guard panel 33.

What is claimed is:

1. A tape cassette for a magnetic tape, comprising:
   a cassette case having formed therein an internal space and having formed in a sidewall thereof a first light port hole and a second light port hole;
   two tape hubs rotatably supported in said internal space for supporting a magnetic tape.
   a prism disposed in said internal space and having a light receiving surface for receiving light from a light emitting element located outside said cassette case through said first light port hole and having a light transmitting surface for transmitting said light reflected in said prism across a transport path of said tape and through said second light port hole to a light receiving element;

a projection projecting outwardly from said cassette case in an area between said first and second light port holes for preventing light reflected from said light receiving surface from reaching said light receiving element; and a locking member movable between first and second locations for locking and unlocking said hubs, said projection being formed unitarily with said locking member.

2. A tape cassette as recited in claim 1, wherein said projection is included in an arm of said locking member movable between said first and second light port holes when said hubs are unlocked.

3. A tape cassette for a magnetic tape, comprising:

a cassette case having formed therein an internal space and having formed in a sidewall thereof a first light port hole and a second light port hole;

two tape hubs rotatably supported in said internal space for supporting a magnetic tape;

a prism disposed in said internal space and having a light receiving surface for receiving light from a light emitting element located outside said cassette case through said first light port hole and having a light transmitting surface for transmitting said light reflected in said prism across a transport path of said tape and through said second light port hole to a light receiving element; and a projection projecting outwardly from said cassette case in an area between said first and second light port holes for preventing light reflected from said light receiving surface from reaching said light receiving element, said cassette further including a locking member movable between first and second locations for locking and unlocking said hubs, said projection being formed unitarily with said locking member and being moved into position between said first and second light port holes when said locking member is moved to said second location.

4. A tape cassette for a magnetic tape, comprising:

a cassette case having formed therein an internal space and having formed in a sidewall thereof a first light port hole and a second light port hole;

two tape hubs rotatably supported in said internal space for supporting a magnetic tape;

a prism disposed in said internal space and having a light receiving surface for receiving light from a light emitting element located outside said cassette case through said first light port hole and having a light transmitting surface for transmitting said light reflected in said prism across a transport path of said tape and through said second light port hole to a light receiving element; and a locking member movable between first and second locations for locking and unlocking said hubs, said locking member including a projection formed unitarily therewith and movable to a location between said first and second light port holes when said locking member is moved to said second location for preventing light reflected from said light receiving surface from reaching said light receiving element.

5. A tape cassette as claimed in claim 4, further comprising a guard panel mounted at a front of said cassette case and being rotatable between first and second positions, said locking member further including at least one portion engageable by said guard panel as said guard panel is rotated from said first position to said second position in a manner such that said locking member is made to move from said first location to said second location in response to the rotation of said guard panel from said first position to said second position.

* * * * *